(12) United States Patent
Gardes et al.

(10) Patent No.: US 11,105,297 B2
(45) Date of Patent: Aug. 31, 2021

(54) TURBOFAN COMPRISING A SET OF ROTATABLE BLADES FOR BLOCKING OFF THE BYPASS FLOW DUCT

(71) Applicant: Airbus Operations SAS, Toulouse (FR)

(72) Inventors: Pascal Gardes, Levignac (FR); Guillaume Seguin, Marseilles (FR); Laurent Tizac, Seilh (FR); Fabien Menou, Saint Jean (FR); Frédéric Ridray, L'Isle Jourdain (FR); Benoit Orteu, Toulouse (FR); Romain Cusset, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 16/745,606

(22) Filed: Jan. 17, 2020

(65) Prior Publication Data

US 2020/0240359 A1 Jul. 30, 2020

(30) Foreign Application Priority Data

Jan. 24, 2019 (FR) ...................................... 1900626

(51) Int. Cl.
*F02K 1/72* (2006.01)
*F02K 1/38* (2006.01)
(Continued)

(52) U.S. Cl.
CPC .............. *F02K 1/383* (2013.01); *B64D 29/06* (2013.01); *F16H 25/18* (2013.01); *F16H 55/26* (2013.01); *F02K 1/72* (2013.01)

(58) Field of Classification Search
CPC ...... F02K 1/64; F02K 1/70; F02K 1/72; F02K 1/54; F02K 1/56; F02K 1/62; F02K 1/625
See application file for complete search history.

(56) References Cited

U.S. PATENT DOCUMENTS 2,567,490 A * 9/1951 Ljungstrom .............. F02K 1/62
244/74
2,933,890 A 4/1960 Morrison
(Continued)

FOREIGN PATENT DOCUMENTS

DE 1937679 A1 2/1971

OTHER PUBLICATIONS

French Search Report; priority document.

*Primary Examiner* — Gerald L Sung
(74) *Attorney, Agent, or Firm* — Greer, Burns & Crain, Ltd.

(57) ABSTRACT

A turbofan having a nacelle comprising a slider translatable between an advanced position and a retracted position to open a window between a duct and the exterior, a plurality of blades, each one rotatable on the slider between a stowed position and a deployed position, and a maneuvering system that moves each blade and comprises, for each blade, a shaft rotatable on the slider and on which the blade is fixed, and a toothed sector fixed to the shaft, and a toothed arc rotatable on the slider about a longitudinal axis, where the teeth of the toothed arc mesh with the teeth of each toothed sector, a cam, as one with the toothed arc, and a groove, as one with a fixed structure, which receives the cam and where, when the slider moves, the cam follows the groove and rotates the toothed arc.

7 Claims, 4 Drawing Sheets

(51) Int. Cl.
  *B64D 29/06* (2006.01)
  *F16H 25/18* (2006.01)
  *F16H 55/26* (2006.01)

(56) References Cited

U.S. PATENT DOCUMENTS

| | | | | |
|---|---|---|---|---|
| 3,040,524 A * | 6/1962 | Kurti | ........................ | F02K 1/76 60/226.2 |
| 3,248,878 A * | 5/1966 | Clark | ........................ | F02K 1/64 60/229 |
| 3,344,604 A * | 10/1967 | Mattia | ........................ | F02K 1/70 60/229 |
| 3,613,827 A * | 10/1971 | Labussiere | ................ | F02K 1/46 181/215 |
| 3,620,022 A * | 11/1971 | Beale | ........................ | F02K 1/70 60/226.2 |
| 3,699,682 A * | 10/1972 | Kleckner | ................ | F02K 1/64 60/226.2 |
| 4,030,290 A | 6/1977 | Stachowiak | | |
| 5,209,057 A * | 5/1993 | Remlaoui | ................ | F02K 1/70 60/226.2 |
| 5,315,821 A * | 5/1994 | Dunbar | ................ | F02K 1/70 60/226.1 |
| 5,396,762 A * | 3/1995 | Standish | ................ | F02K 1/563 239/265.19 |
| 5,782,432 A * | 7/1998 | Renshaw | ................ | F02K 1/06 244/53 R |
| 5,956,939 A * | 9/1999 | Fage | ........................ | F02K 1/386 60/226.2 |
| 2013/0025260 A1* | 1/2013 | Pitiot | ........................ | F02K 1/64 60/226.2 |
| 2014/0150403 A1* | 6/2014 | Stuart | ........................ | F02K 1/72 60/204 |
| 2014/0325956 A1* | 11/2014 | James | ........................ | F02K 1/70 60/204 |
| 2015/0122904 A1* | 5/2015 | Burghdoff | ................ | F02K 1/72 239/1 |
| 2016/0047333 A1* | 2/2016 | Starovic | ................ | F02K 1/72 239/265.19 |
| 2017/0198658 A1* | 7/2017 | Higgins | ................ | B64D 33/04 |
| 2017/0204811 A1* | 7/2017 | Davies | ........................ | F02K 1/72 |
| 2019/0257269 A1* | 8/2019 | Rambaud | ................ | B64D 29/06 |
| 2019/0284952 A1* | 9/2019 | Gardes | ........................ | F01D 17/167 |
| 2020/0182193 A1* | 6/2020 | Iglewski | ................ | B64C 9/36 |
| 2020/0191156 A1* | 6/2020 | Gardes | ........................ | F02K 1/72 |
| 2020/0325785 A1* | 10/2020 | Gardes | ........................ | F01D 7/00 |
| 2020/0325848 A1* | 10/2020 | Gardes | ................ | F02C 7/057 |
| 2020/0362708 A1* | 11/2020 | Gardes | ........................ | F01D 7/00 |
| 2020/0378340 A1* | 12/2020 | Cousin | ........................ | F02K 1/72 |
| 2021/0017935 A1* | 1/2021 | Cazeaux | ................ | F02K 1/763 |

\* cited by examiner

TURBOFAN COMPRISING A SET OF ROTATABLE BLADES FOR BLOCKING OFF THE BYPASS FLOW DUCT

CROSS-REFERENCES TO RELATED APPLICATIONS

This application claims the benefit of the French patent application No. 1900626 filed on Jan. 24, 2019, the entire disclosures of which are incorporated herein by way of reference.

FIELD OF THE INVENTION

The present invention relates to a turbofan which comprises a set of blades which are mounted so as to be able to rotate in order to block the duct for the bypass flow, and to an aircraft comprising at least one such turbofan.

BACKGROUND OF THE INVENTION

An aircraft includes a fuselage to each side of which is fixed a wing. Under each wing is suspended at least one turbofan. Each turbofan is fixed under the wing by means of a pylon that is fixed between the structure of the wing and the structure of the turbofan.

The turbofan comprises a motor and a nacelle that is fixed around the motor. The turbofan has, between the nacelle and the motor, a bypass duct in which a bypass flow flows.

The nacelle comprises a plurality of reversal doors, each one being mobile in rotation on the structure of the nacelle, between a stowed position in which it is not in the bypass duct and a deployed position in which it is positioned across the bypass duct in order to redirect the bypass flow towards a window which is in the wall of the nacelle and which is open between the bypass duct and the outside of the nacelle.

Thus, the bypass flow is redirected to the outside and more specifically towards the front of the engine in order to generate reverse thrust.

Although reversal doors are entirely satisfactory, it is desirable to find different mechanisms, in particular more lightweight mechanisms.

SUMMARY OF THE INVENTION

One object of the present invention is to propose a turbofan which comprises a set of blades which are mounted so as to be able to rotate in order to block the duct of the bypass flow.

To that end, a turbofan is proposed having a longitudinal axis and comprising a motor and a nacelle, surrounding the motor, which comprises a fan casing, in which a duct for a bypass flow is delimited between the nacelle and the motor, and in which a flow of air flows in a flow direction, said nacelle comprising:
  a fixed structure fixed to the fan casing,
  a mobile assembly having a mobile cowl and a slider, the mobile cowl being fixed to the slider, the slider being mobile in translation, on the fixed structure, in a direction of translation between an advanced position in which the slider is positioned such that the mobile cowl is moved close to the fan casing and a retracted position in which the slider is positioned such that the mobile cowl is moved away from the fan casing so as to define, between them, an open window between the duct and the exterior of the nacelle,
  a plurality of blades, each one comprising a first end mounted so as to be mobile in rotation on the slider about an axis of rotation, and where the blades are angularly offset from one to the next about the longitudinal axis, wherein each blade is mobile between a stowed position in which the blade is outside the duct and a deployed position in which the blade is across the duct,
  an assembly of actuators causing the slider to move between the advanced position and the retracted position, and vice versa, and
  a maneuvering system intended to move each blade from the stowed position to the deployed position and vice versa, where the maneuvering system comprises:
  for each blade, a shaft mounted so as to be mobile in rotation on the slider about an axis of rotation, and on which the blade is fixed,
  for each blade, a toothed sector that is fixed to the shaft and is coaxial with the axis of rotation,
  a toothed arc that is coaxial with the longitudinal axis, mounted so as to be mobile in rotation on the slider about the longitudinal axis, where the teeth of the toothed arc mesh with the teeth of each toothed sector,
  a cam as one with the toothed arc, and
  a groove, as one with the fixed structure, which receives the cam and where, when the mobile assembly moves, the cam follows the groove and rotates the toothed arc.

An engine of this kind permits a reduction in mass by replacing the reversal doors and their drive mechanisms with more lightweight pivoting blades having a simplified maneuvering system.

Advantageously, the mobile cowl comprises a U-shaped profile coaxial with the longitudinal axis and open towards the longitudinal axis, the blades are mounted mobile in rotation on the U-shaped profile, in the stowed position, each blade is received in the U-shaped profile and, in the deployed position, a second end of each blade leaves the U-shaped profile.

Advantageously, the groove has a proximal end where the cam is located when the slider is in the advanced position, and the groove has, at its proximal end, a straight portion parallel to the direction of translation.

Advantageously, the axis of rotation of each blade has an offset angle relative to the longitudinal axis, where the offset angle must be large enough to avoid contact between the blades during movements, and small enough to avoid the blades moving apart from one another in the deployed position.

Advantageously, the maneuvering system comprises a plurality of rollers arranged below the toothed arc, where each one is mounted so as to be mobile in rotation on the slider about an axis that is generally parallel to the longitudinal axis.

Advantageously, the turbofan has two toothed arcs on each side, and the two toothed arcs move in opposite directions of rotation.

The invention also proposes an aircraft comprising at least one turbofan in accordance with one of the above variants.

BRIEF DESCRIPTION OF THE DRAWINGS

The abovementioned features of the invention, along with others, will become more clearly apparent on reading the following description of one exemplary embodiment, said description being given with reference to the appended drawings, in which.

DETAILED DESCRIPTION OF THE PREFERRED EMBODIMENTS

In the following description, the terms relating to a position refer to the direction of flow of the air in an engine which therefore flows from the front to the rear of the aircraft.

Figure 1:
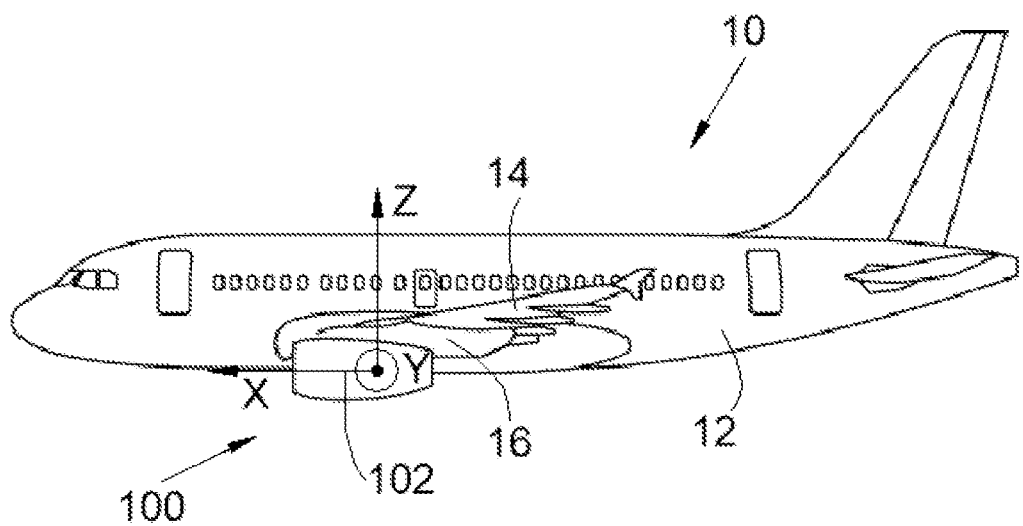
FIG. 1 is a side view of an aircraft comprising a turbofan according to the invention.

FIG. 1 shows an aircraft 10 that comprises a fuselage 12, to each side of which is fixed a wing 14 that bears at least one turbofan 100 according to the invention. The turbofan 100 is fixed under the wing 14 by means of a pylon 16.

Figure 2:
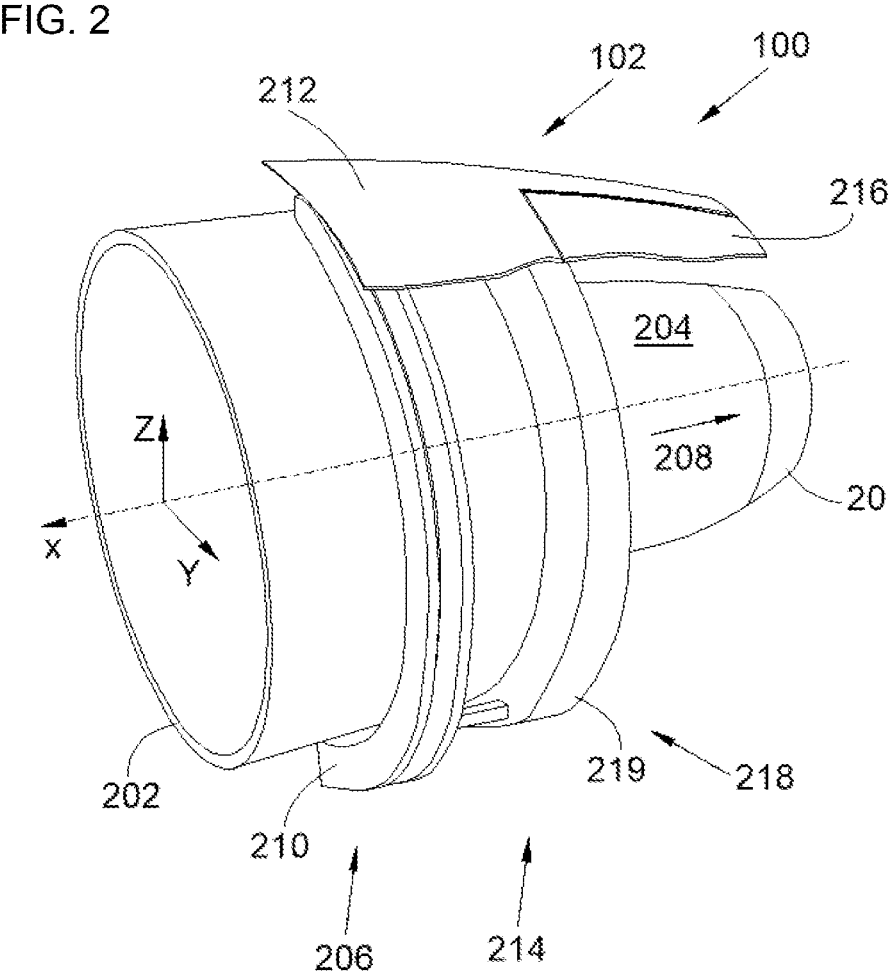
FIG. 2 is a perspective view of the turbofan according to the invention in the advanced and stowed position.
Figure 3:
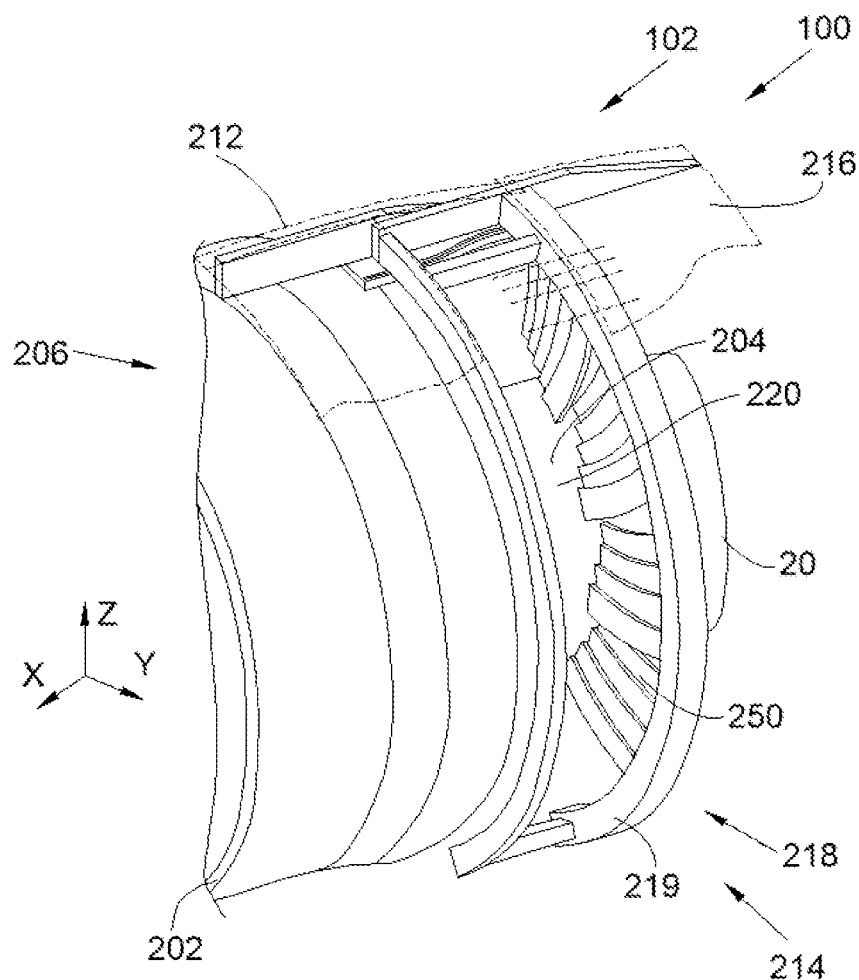
FIG. 3 is a perspective view of the turbofan according to the invention in the retracted and deployed position.

FIG. 2 and FIG. 3 show the turbofan 100 which has a nacelle 102 and a motor 20 which is housed inside the nacelle 102 and comprises a fan casing 202. The motor 20 is represented by its rear exhaust part.

In the following description, and by convention, X denotes the longitudinal axis of the turbofan 100 that is parallel to the longitudinal axis of the aircraft 10 oriented positively towards the front of the aircraft 10, Y denotes the transverse axis which is horizontal when the aircraft is on the ground, and Z denotes the vertical axis, these three directions X, Y and Z being mutually orthogonal.

Figure 4:
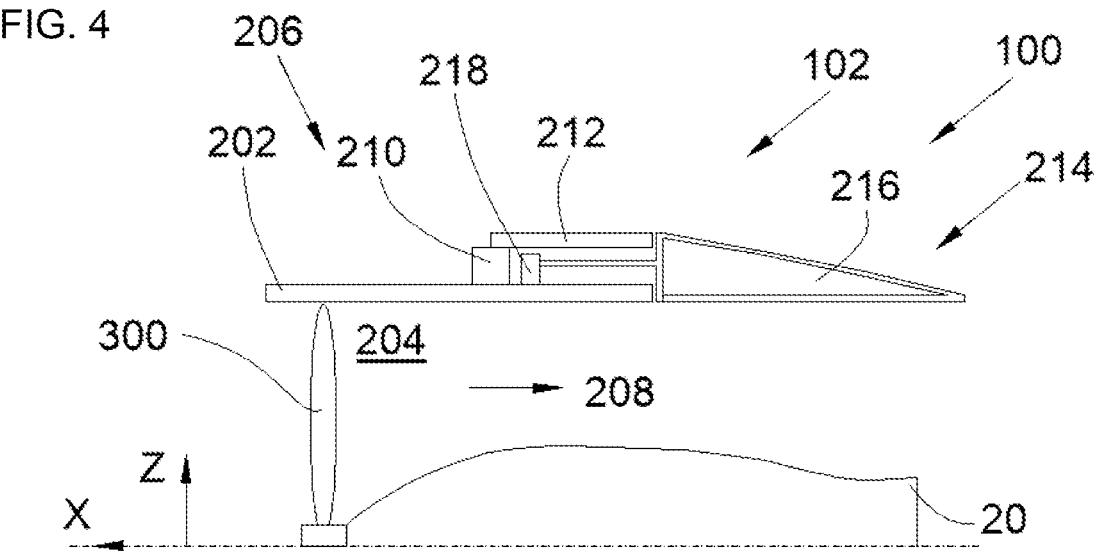
FIG. 4 is a schematic representation of a turbofan according to the invention, viewed in vertical section.

FIG. 2 and FIG. 3 show the turbofan 100 in two different use positions, and FIG. 4 shows a schematic representation in section of the turbofan 100.

The turbofan 100 has, between the nacelle 102 and the motor 20, a duct 204 in which flows a bypass flow 208 coming from the air intake through a fan 300, and which therefore flows in the flow direction from forward to rear.

The nacelle 102 has a fixed structure 206 that is mounted fixed on the fan casing 202. Here, in particular, the fixed structure 206 comprises a front frame 210 mounted around the fan casing 202 and outer panels 212 forming an aerodynamic surface which are shown as transparent in FIG. 3, and of which a portion is cut away in FIGS. 2 and 3.

The nacelle 102 has a mobile assembly 214 which has a mobile cowl 216 (also transparent in FIG. 3) of which a portion is cut away in FIGS. 2 and 3 and which forms the outer walls of the nozzle.

The nacelle 102 also has a slider 218. In this case, the slider 218 is in the form of a cylinder having openwork walls. The mobile cowl 216 is fixed to and downstream of the slider 218 with respect to the direction of flow of the flow of air in the turbofan 100.

The slider 218 is mounted mobile in translation in a translation direction globally parallel to the longitudinal axis X on the fixed structure 206 of the nacelle 102.

The slider 218 is mobile between an advanced position (FIG. 2) and a retracted position (FIG. 3) and vice versa. In the advanced position, the slider 218 is positioned as far forward as possible, with respect to the flow direction, such that the mobile cowl 216 is moved close to the outer panels 212 and to the fan casing 202 and thus forms an aerodynamic surface. In the retracted position, the slider 218 is positioned as far aft as possible, with respect to the flow direction, such that the mobile cowl 216 is moved away from the outer panels 212 and from the fan casing 202 so as to define, between them, a window 220.

In the advanced position, the mobile cowl 216 and the outer panels 212 extend one another so as to define the outer surface of the nacelle 102, and the mobile cowl 216 and the fan casing 202 extend one another so as to define the outer surface of the duct 204.

In the retracted position, the mobile cowl 216 and the fan casing 202, and the outer panels 212, are spaced apart from one another and define, between them, the open window 220 between the duct 204 and the exterior of the nacelle 102. That is to say that the air from the bypass flow 208 passes through the window 220 to end up outside the turbofan 100.

The slider 218 is made to translate by any appropriate means, such as slideways between the fixed structure 206 and the slider 218.

The nacelle 102 also comprises a set of actuators (not shown) that move the slider 218 in translation between the advanced position and the retracted position and vice versa. Each actuator is controlled by a control unit, for example of the processor type, which controls the movements in one direction or the other according to the requirements of the aircraft 10.

Each actuator may, for example, take the form of a double-action jack (two working directions), of which the cylinder is fixed to the fixed structure 206 and a rod is fixed to the slider 218.

In order to orient the flow of air leaving the window 220, cascades can be fixed to the slider 218 facing the window 220.

The fan casing 202 and the outer panels 212 form the upstream boundary of the window 220 with respect to the direction of flow and the mobile cowl 216 forms the downstream boundary of the window 220 with respect to the direction of flow.

The nacelle 102 comprises a plurality of blades 250, each being mounted so as to be able to rotate on the slider 218 about an axis of rotation that, here, is generally parallel to the longitudinal axis X. Thus, each blade 250 is able to move between a stowed position (FIG. 2) in which the blade 250 is outside the duct 204 and a deployed position (FIG. 3) in which the blade 250 is across the duct 204 in order to redirect the bypass flow 208 towards the window 220.

Each blade 250 is mounted so as to be able to move at a first end while a second end moves closer to the motor 20 when the blade 250 is deployed so as to best block the duct 204.

The blades 250 are angularly offset from one to the next about the longitudinal axis X.

The number of blades 250, and the shape of each of these, depend on the dimensions of the turbofan 100 and on the width of each blade 250 in order that, in the deployed position, the blades 250 block the majority of the duct 204.

Passage from the stowed position to the deployed position is brought about by rotation of the blade 250 towards the interior of the engine 100.

The stowed position can be adopted when the slider 218 is in the advanced position or the retracted position. The deployed position can be adopted only when the slider 218 is in the retracted position.

The slider 218 also has a maneuvering system 400 which moves each blade 250 from the stowed position to the deployed position and vice versa, and which is described hereinbelow.

Thus, operation comprises, starting from the advanced/stowed position, ordering activation of the actuators to move the slider 218 from the advanced position to the retracted position; during this movement, the maneuvering system 400 moves the blades 250 from the stowed position to the deployed position.

Conversely, operation thus comprises, starting from the retracted/deployed position, ordering activation of the actuators to move the slider 218 from the retracted position to the advanced position; during this movement, the maneuvering system 400 moves the blades 250 from the deployed position to the stowed position.

The use of the blades 250 mounted so as to be able to rotate on the slider 218 makes it possible to lighten the assembly compared to the use of reversal doors of the prior art.

Figure 5:
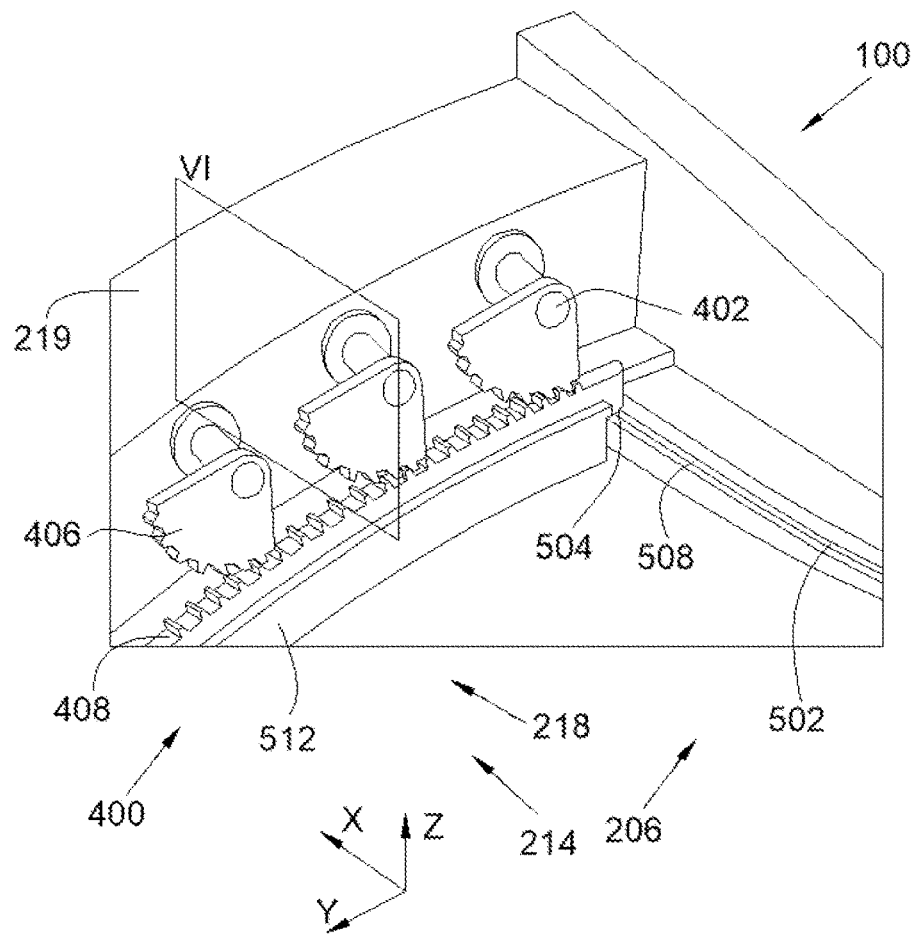
FIG. 5 is a perspective view from behind of a maneuvering system according to the invention.
Figure 6:
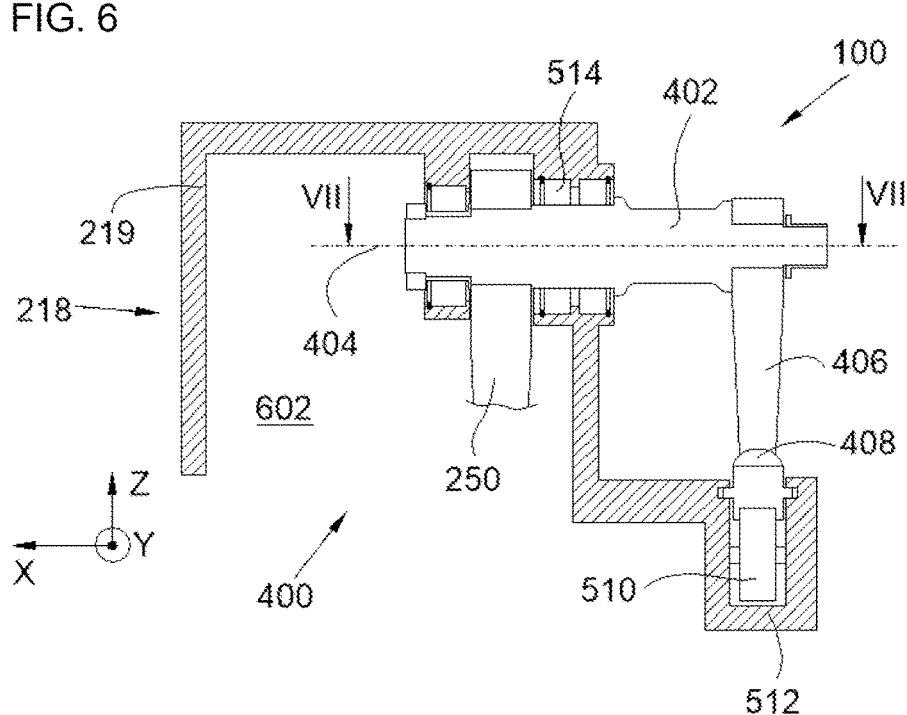
FIG. 6 shows a view in section in plane VI of FIG. 5.
Figure 7:
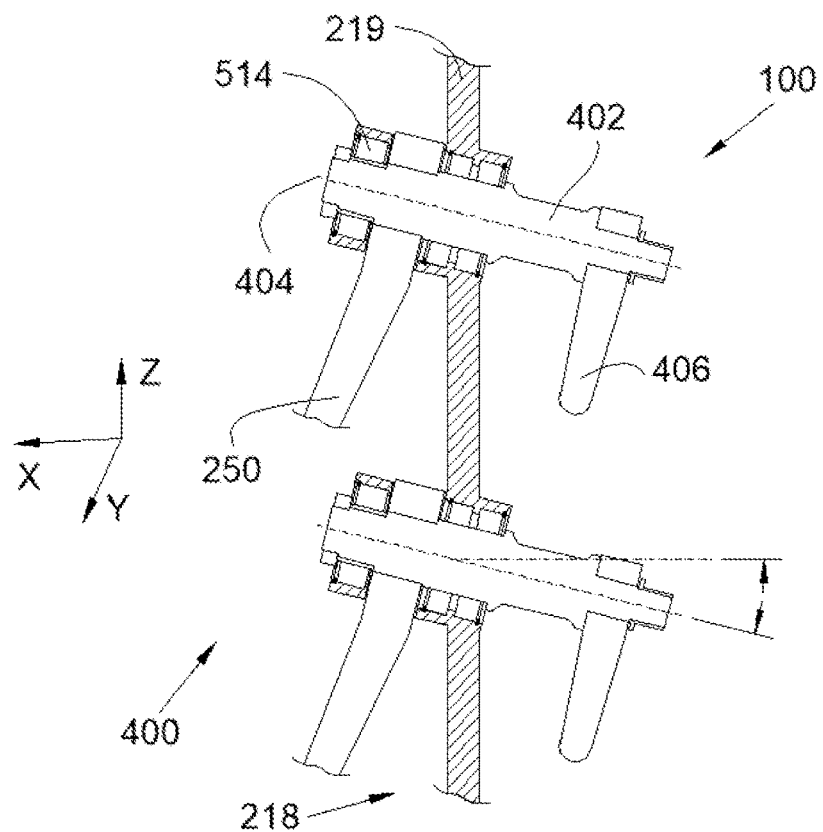
FIG. 7 is a view in section along the line VII-VII of FIG. 6.

FIG. 5 shows the maneuvering system 400, and FIGS. 6 and 7 show sections through the maneuvering system 400.

For each blade 250, the maneuvering system 400 comprises a shaft 402 which is mounted so as to be mobile in rotation on the slider 218 about an axis of rotation 404, and on which the blade 250 is fixed.

For each blade 250, the maneuvering system 400 also comprises a toothed sector 406 that is fixed to the shaft 402 and is coaxial with the axis of rotation 404.

The maneuvering system 400 also comprises a toothed arc 408 that is coaxial with the longitudinal axis X. The toothed arc 408 is mounted so as to be mobile in rotation on the mobile assembly 214, and more particularly on the slider 218, about the longitudinal axis X.

The teeth of the toothed arc 408 mesh with the teeth of each toothed sector 406. Thus, rotation of the toothed arc 408 causes rotation of each toothed sector 406 and thus of the associated blade 250.

Each blade 250 extends in a plane generally perpendicular to the longitudinal axis X.

Each blade 250 is mounted so as to be able to move on the perimeter of the slider 218. When the blades 250 are in the stowed position, they stack along the longitudinal axis X.

The fixed structure 206 comprises a groove 502 which, here, is arranged at 12 o'clock.

The toothed arc 408 is equipped with a cam 504 which is received in the groove 502. In the embodiment of the invention presented here, the cam 504 is fixed to an end of the toothed arc 408, but it could be at a different location on the toothed arc 408.

As the mobile assembly 214 moves towards the retracted position, the cam 504 follows the groove 502 and a deviation of the groove 502 causes a rotation of the cam 504, and therefore of the toothed arc 408, about its axis of rotation and, by entrainment, the rotation of each toothed sector 406 and therefore of each blade 250 towards its deployed position, and vice versa.

The groove 502 has a shape which is suitable to allow the rotation of the blade 250 from the stowed position to the deployed position when the slider 218 passes from the advanced position to the retracted position. Conversely, the groove 502 has a shape which is suitable to allow the rotation of the blade 250 from the deployed position to the stowed position when the slider 218 passes from the retracted position to the advanced position.

The groove 502 has a proximal end where the cam 504 is positioned when the slider 218 is in the advanced position, and a distal end where the cam 504 is positioned when the slider 218 is in the retracted position.

To avoid the blade 250 deploying right from the beginning of the translation of the slider 218 towards its retracted position, the groove 502 has, at its proximal end, a straight portion 508 parallel to the direction of translation.

The maneuvering system 400 therefore also comprises the groove 502 and the cam 504.

Thus, moving all of the blades 250 is relatively simple to implement and does not require actuators beyond those necessary for moving the slider 218.

Multiple solutions to ensure that the blades 250 do not come into contact with one another during movements are possible.

For example, according to one particular embodiment, shown in FIG. 7, the axis of rotation 404 of each blade 250 has an offset angle α relative to the longitudinal axis X. The offset angle α depends on how crowded each blade 250 is, and is for example of the order of 5° to 20°.

The offset angle α must therefore be large enough to avoid contact between the blades 250 during movements, and small enough to avoid the blades 250 moving apart from one another in the deployed position, which would allow air to pass through the blades 250. Thus, in the deployed position, the blades 250 must be in contact with one another and preferably the edges of two neighboring blades 250 overlap.

The slider 218 has a U-shaped profile 219 that is coaxial with the longitudinal axis X and open towards the longitudinal axis X. The U-shaped profile 219 forms a cage 602 where the blades 250 are mounted so as to be mobile in rotation on the U-shaped profile 219.

In the stowed position, each blade 250 is received in the U-shaped profile 219, and in the deployed position the second end leaves the U-shaped profile 219 to move closer to the motor 20.

In the embodiment of the invention presented in FIG. 6, the toothed arc 408 and the slider 218 form a pivoting connection by cooperation between the ribs of the toothed arc 408 and the grooves of the slider 218. Other embodiments are of course possible.

In order to facilitate the movement of the toothed arc 408, the maneuvering system 400 comprises a plurality of rollers 510 arranged below the toothed arc 408, where each one is mounted so as to be mobile in rotation on the slider 218 about an axis that is generally parallel to the longitudinal axis X.

In the embodiment of the invention presented in FIG. 6, the rollers 510 are mounted in a chute 512 of the slider 218.

Here, the rotation of each shaft 402 on the slider 218 is brought about by a set of bearings 514.

The invention has been more particularly described in the case of one toothed arc 408 on each side of the turbofan 100, but in order to reduce the dimensions of the toothed arc 408 it is possible to provide two toothed arcs 408 on each side, where the toothed arcs 408 move in opposite directions of rotation. Certain blades 250 will then mesh with one of the toothed arcs 408 and the other blades 250 will then mesh with the other toothed arc 408.

In order to verify the movement of the toothed arc 408, it is possible to install a sensor.

The invention has been more particularly described in the case of a nacelle under a wing but can be applied to a nacelle located at the rear of the fuselage.

According to another embodiment, the blades can be offset with respect to one another, parallel to the longitudinal axis X.

Figure 8:
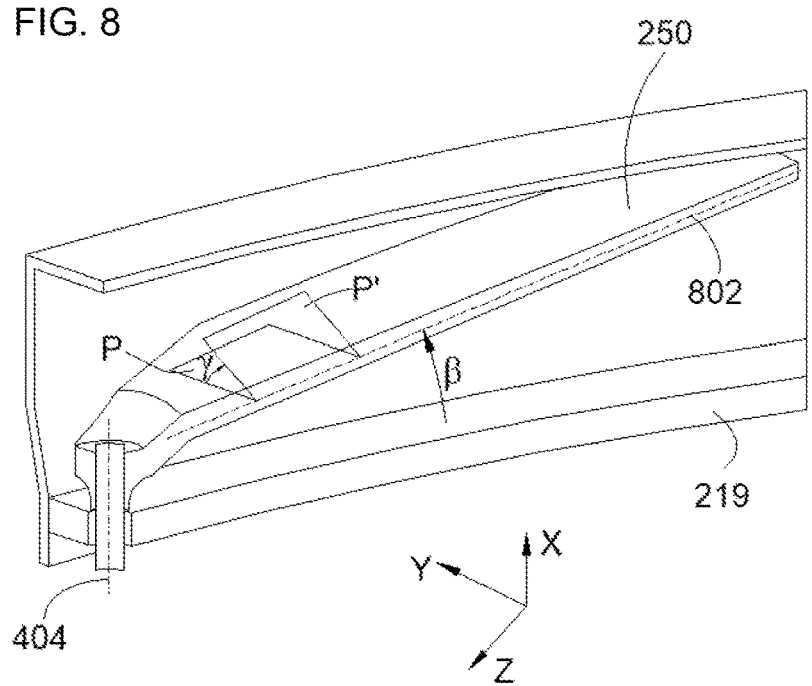
FIG. 8 is a perspective view of another embodiment of the invention.

According to another particular embodiment, shown in FIG. 8 which is a view in section, the axis of rotation 404 of each blade 250 is parallel to the longitudinal axis X and each blade 250 has a particular and tailored shape which ensures that the blades 250 do not come into contact with one another during movements.

The blade 250 has a neutral axis 802 which, in general, is the central line of the blade 250 and this neutral axis 802 has a clearance angle $\beta$ relative to a base plane perpendicular to the axis 404 of the blade 250 and in this case in the form of a wall of the U-shaped profile 219, where $0°<\beta<15°$.

The blade 250 has a neutral plane P' which includes the neutral axis 802 and which is generally the mid-plane of the blade 250, this neutral plane P' has a pitch angle $\gamma$ relative to another base plane P perpendicular to the axis 404 of the blade 250 and including the neutral axis 802, where $0°<\gamma<20°$.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan having a longitudinal axis and comprising a motor and a nacelle, surrounding the motor, which comprises a fan casing, in which a duct for a bypass flow is delimited between the nacelle and the motor and in which a flow of air flows in a flow direction, said nacelle comprising:
   a fixed structure fixed to the fan casing,
   a mobile assembly having a mobile cowl and a slider, the mobile cowl being fixed to the slider, the slider being mobile in translation, on the fixed structure, in a direction of translation between an advanced position in which the slider is positioned such that the mobile cowl is moved close to the fan casing and a retracted position in which the slider is positioned such that the mobile cowl is moved away from the fan casing so as to define, between the fan casing and the mobile cowl, an open window between the duct and the exterior of the nacelle,
   a plurality of blades, each one comprising a first end mounted so as to be mobile in rotation on the slider about an axis of rotation, and where the plurality of blades are angularly offset from one to the next about the longitudinal axis, wherein each blade of the plurality of blades is mobile between a stowed position in which the plurality of blades are outside the duct and a deployed position in which the plurality of blades are across the duct,
   an assembly of actuators causing the slider to move between the advanced position and the retracted position, and vice versa, and
   a maneuvering system intended to move each blade from the stowed position to the deployed position and vice versa,
   wherein the maneuvering system comprises:
      for each blade, a shaft mounted so as to be mobile in rotation on the slider about the axis of rotation, and on which each respective blade is fixed,
      for each blade, a toothed sector that is fixed to the shaft and is coaxial with the axis of rotation,
      a toothed arc that is coaxial with the longitudinal axis, mounted so as to be mobile in rotation on the slider about the longitudinal axis, where the teeth of the toothed arc mesh with the teeth of each toothed sector,
      a cam as one with the toothed arc, and
      a groove, as one with the fixed structure, which receives the cam and wherein, when the mobile assembly moves, the cam follows the groove and rotates the toothed arc.

2. The turbofan according to claim 1,
   wherein the mobile cowl comprises a U-shaped profile coaxial with the longitudinal axis and open towards the longitudinal axis,
   wherein the plurality of blades are mounted mobile in rotation on the U-shaped profile,
   wherein, in the stowed position, each blade is received in the U-shaped profile, and
   wherein, in the deployed position, a second end of each blade leaves the U-shaped profile.

3. The turbofan according to claim 1,
   wherein the groove has a proximal end where the cam is located when the slider is in the advanced position, and
   wherein the groove has, at the proximal end, a straight portion parallel to the direction of translation.

4. The turbofan according to claim 1, wherein the axis of rotation of each blade has an offset angle relative to the longitudinal axis, where the offset angle is large enough to avoid contact between the plurality of blades during movements, and small enough to avoid the blades moving apart from one another in the deployed position.

5. The turbofan according to claim 1, wherein the maneuvering system comprises a plurality of rollers arranged below the toothed arc, wherein each roller is mounted so as to be mobile in rotation on the slider about an axis that is generally parallel to the longitudinal axis.

6. The turbofan according to claim 1,
   wherein the maneuvering system comprises a second toothed arc, and
   wherein the toothed arc and the second toothed arc move in opposite directions of rotation.

7. An aircraft comprising at least one turbofan according to claim 1.

* * * * *